(12) United States Patent
Gawronski et al.

(10) Patent No.: US 8,441,402 B2
(45) Date of Patent: May 14, 2013

(54) MEASURING INSTRUMENT

(75) Inventors: Michael Gawronski, Haibach (DE); Joachim Ciba, Bürgstadt (DE); Achim Gareus, Weckbach (DE)

(73) Assignee: Wika Alexander Wiegand GmbH & Co. KG, Klingenberg/Main (DE)

( * ) Notice: Subject to any disclaimer, the term of this patent is extended or adjusted under 35 U.S.C. 154(b) by 587 days.

(21) Appl. No.: 12/700,933

(22) Filed: Feb. 5, 2010

(65) Prior Publication Data
US 2010/0201585 A1  Aug. 12, 2010

(30) Foreign Application Priority Data
Feb. 6, 2009 (DE) .......................... 10 2009 000 692

(51) Int. Cl.
*H01Q 1/00* (2006.01)

(52) U.S. Cl.
USPC .......................................... 343/720; 343/702

(58) Field of Classification Search .................. 343/720, 343/702, 718; 73/732
See application file for complete search history.

(56) References Cited

U.S. PATENT DOCUMENTS

| | | | |
|---|---|---|---|
| 5,659,300 A * | 8/1997 | Dresselhuys et al. .... | 340/870.02 |
| 6,115,677 A | 9/2000 | Perthold et al. | |
| 6,181,294 B1 | 1/2001 | Porter et al. | |
| 6,304,231 B1 * | 10/2001 | Reed et al. ..................... | 343/873 |
| 6,954,178 B2 * | 10/2005 | Winter ................... | 343/700 MS |
| 7,343,795 B2 | 3/2008 | Winter | |
| 2005/0079903 A1 * | 4/2005 | Taketomi et al. .......... | 455/575.5 |
| 2005/0221277 A1 * | 10/2005 | Kawanishi ......................... | 435/4 |
| 2008/0227235 A1 | 9/2008 | Theuss et al. | |
| 2009/0045918 A1 | 2/2009 | Droesler et al. | |
| 2009/0212953 A1 | 8/2009 | Ross-Messemer | |

FOREIGN PATENT DOCUMENTS

| | | |
|---|---|---|
| DE | 537314 | 10/1931 |
| DE | 93 15 4273.5 U1 | 2/1994 |
| DE | 296 07 866 U1 | 9/1997 |
| DE | 197 12 098 A1 | 5/1998 |
| DE | 199 03 049 A1 | 8/2000 |
| DE | 100 04 222 A1 | 6/2001 |
| DE | 102 42 494 A1 | 3/2004 |
| DE | 10 2006 010 159 A1 | 9/2007 |
| DE | 10 2006 031 968 A1 | 1/2008 |
| DE | 60 2005 001 685 T2 | 7/2008 |
| DE | 10 2007 012 335 A1 | 9/2008 |
| EP | 0 619 620 A2 | 10/1994 |
| EP | 0 777 292 B1 | 6/1997 |
| EP | 1 634 047 B1 | 7/2008 |
| WO | 97/11445 A1 | 3/2007 |

* cited by examiner

*Primary Examiner* — Hoanganh Le
(74) *Attorney, Agent, or Firm* — Baker & Hostetler LLP

(57) ABSTRACT

A measuring instrument for measuring a measurand of an object under measurement is provided. The measuring instrument includes a functional member for converting the measurand into a metered value, a housing and an antenna, in which at least part of the housing and/or part of the functional member form a component part of the antenna.

18 Claims, 4 Drawing Sheets

MEASURING INSTRUMENT

CROSS-REFERENCE TO RELATED APPLICATIONS

This application claims priority to foreign Patent Application DE 10 2009 000692.3, filed on Feb. 6, 2009, the disclosure of which is incorporated herein by reference in its entirety.

FIELD OF THE INVENTION

The present invention relates to a measuring instrument for measuring a measurand of an object under measurement. More particularly, the present invention relates to a measuring instrument including an antenna for data transmission.

BACKGROUND OF THE INVENTION

Measuring instruments are indispensable for monitoring in physical or chemical processes, for instance, to ensure safe and smooth course of such processes.

Measuring instruments are employed in simple processes such as a domestic heating system but also in very complicated large-scale industrial plants.

Primarily in the latter permanent monitoring of parameters of a process is of salient importance. In a complex process a large number of measuring instruments may be required because of the numerous parameters to be monitored. Since it is difficult to carry out a permanent manual reading of many different measuring instruments, it is known to convert metered values into signals and transmit them through wires to a monitoring means.

Each measuring instrument is provided with a converting means for converting the respective metered values into electric signals, for instance. Furthermore, between each measuring instrument and the monitoring means a wire is provided for the transmission of the values. Frequently, specific plug elements are provided at the measuring instruments.

In the case of possible malfunctions or troubles it is also reasonable, however, to allow values to be read from the measuring instrument itself.

However, providing wires and/or plug-in elements at each of the measuring instruments is difficult and expensive.

Furthermore it is known that data can be transmitted via an antenna to appropriate receiving means, for instance via radio signal. For this purpose, appropriate transmitters are provided, for example.

It is a drawback of providing transmitters in a monitoring system that additional costs are incurred, more space is required and those devices and the antennas attached to them can be easily damaged or can be an obstacle, such as, for example, in the case of maintenance work.

SUMMARY OF THE INVENTION

Embodiments of the present invention advantageously provide an enhanced measuring instrument.

This enhancement is achieved, in accordance with embodiments of the present invention, by a measuring instrument for measuring a measurand of an object under measurement comprising a functional member for converting the measurand into a metered value, a housing and an antenna, at least part of the housing and/or part of the functional member constituting a component part of the antenna.

The measuring instrument preferably comprises a circuit for converting the metered value into a radio signal, the antenna emitting the radio signal.

The housing can further include a metallic member which forms a ground plane of the antenna.

The housing can also include two metallic members electrically insulated against each other by an insulating member, wherein the metallic members form dipoles of the antenna.

A portion of the housing at the measuring instrument can include an optical display, the antenna being included in the optical display. The optical display can have an observation window with the antenna being applied to the observation window in the form of an antenna structure. The observation window may be made of glass, the antenna being a conductive structure printed on the glass, especially in circular or "C" shape.

The antenna may also be in the form of a dial or may be applied to the latter, especially when it is made of plastic material.

In particular the antenna can also be part of the printing, i.e., an open printed circle segment.

Moreover, a portion of the housing of the measuring instrument can be made of plastic material, the antenna being provided as antenna structure at said portion.

The functional member preferably includes a meter movement including a movable element having a pointer and a dial. The antenna can be in the form of an antenna structure formed on the dial.

The antenna structure is preferably formed by a conductive paste.

The antenna structure can also be a molded interconnect device.

The pointer of the movable element can be an antenna.

Furthermore the measuring instrument can be a manometer. In this case, the functional member preferably includes a Bourdon spring and a return spring, the antenna being formed by the Bourdon spring and/or the return spring.

Preferably the housing is hermetically sealed.

The measuring instrument can further comprise a connector input for connecting the object under measurement to the measuring instrument and for entering the measurand, wherein the connector input is connected to the object under measurement in a sealing manner.

Preferably the measuring instrument moreover includes energy supply to supply the circuit for conversion. The energy supply may comprise a battery and/or a fuel cell and/or a photovoltaic element.

BRIEF DESCRIPTION OF THE DRAWINGS

Hereinafter various embodiments of the present invention are described with reference to the attached drawings, in which.

DETAILED DESCRIPTION

Figure 1:
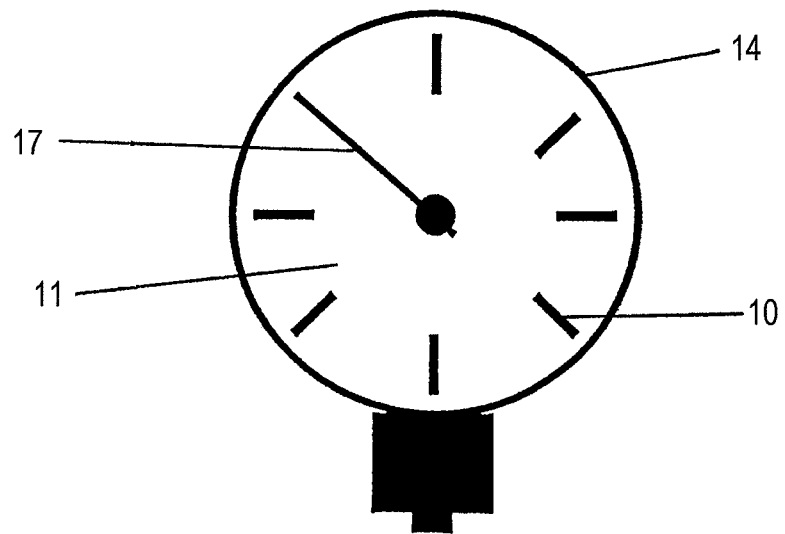
FIG. 1 shows a pointer manometer according to an embodiment of the present invention.

FIG. 1 shows a pressure gauge (manometer) as example of a measuring instrument according to the invention. The shown manometer includes a housing 14 and an observation window 11 below which a dial 10 having a scale is provided from which a metered value can be read with the aid of a pointer 17.

In accordance with embodiments of the invention, the measuring instrument comprises a functional member for converting the measurand into a metered value, a housing and an antenna, at least part of the housing and/or part of the functional member forming part of the antenna.

The measuring instrument can be a manometer for pressure measuring, but the measuring instrument can also be suited for measuring a temperature, a flow, a level/fill level or other variables.

The component parts of the measuring instrument contained in the measuring instrument for converting a measurand into a metered value are referred to as functional member of the measuring instrument.

In a temperature gauge this can be, for instance, a bi-metallic element or a resistance element for temperature measurement.

Figure 2:
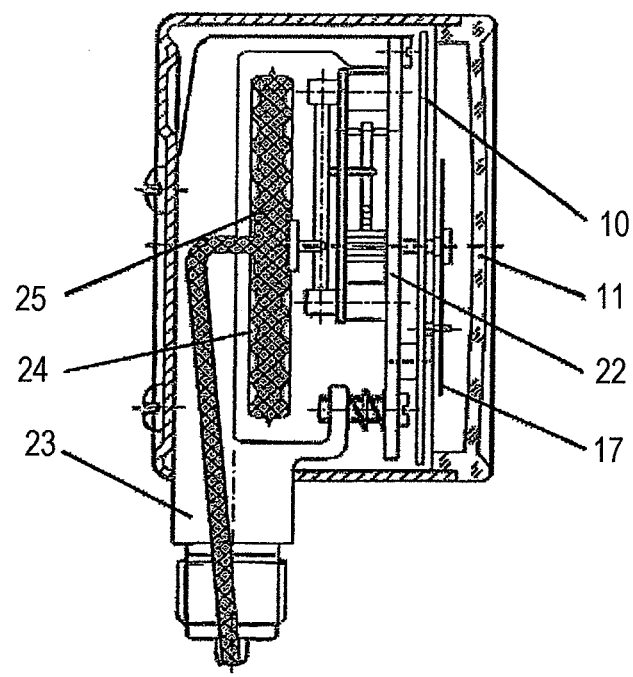
FIG. 2 shows a sectional view of the pointer manometer according to an embodiment of the invention.
Figure 3:
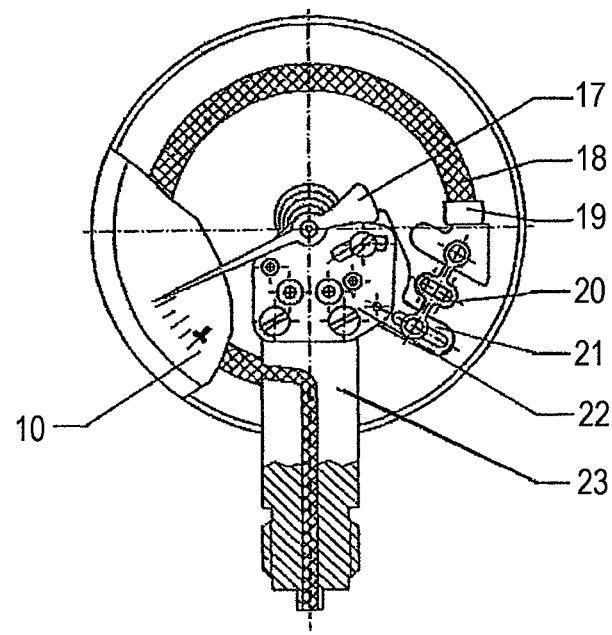
FIG. 3 shows another sectional view of the pointer manometer according to an embodiment of the invention.

As illustrated in FIGS. 2 and 3, the functional member in a manometer can comprise, for example, one or more of the following component parts: A pointer 17, a tubular spring 18, a spring end piece 19, a drawbar 20, a tooth segment 21, a pointer movement 22, a spring support 23, a capsule-type spring 24 or a pressure chamber 25.

In accordance with an embodiment of the present invention, the measuring instrument includes a metallic housing portion. This element serves as ground plane in an electric circuit which is part of the antenna.

Integrating the housing in the antenna circuit allows to save component parts and thus to reduce the costs of the measuring instrument.

In another embodiment of the invention, the measuring instrument includes at least two metallic elements which may be in form of a housing and a cover, for instance.

Figure 4:
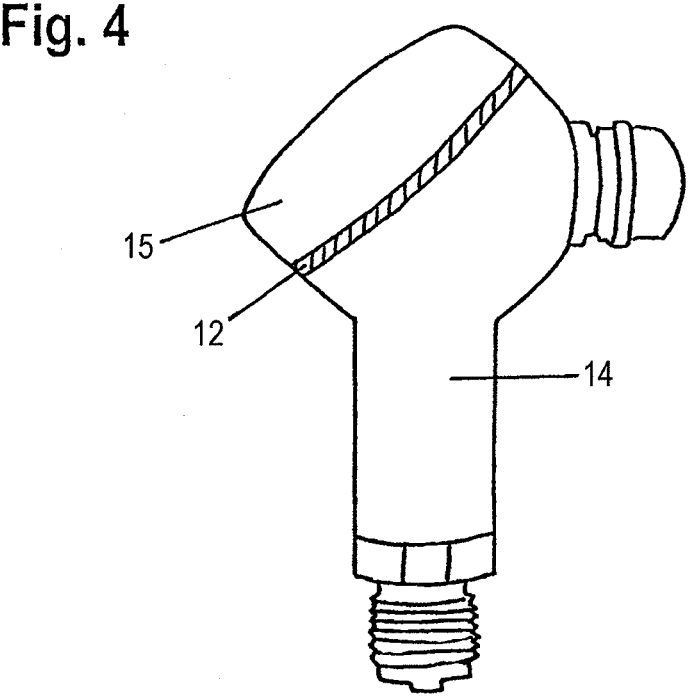
FIG. 4 shows a measuring instrument encompassed by a housing according to a further embodiment of the present invention.

FIG. 4 illustrates a measuring instrument having a housing 14 of metal and a cover 15 of metal. These conducting members serve as dipoles of an antenna. In order to separate these conductors from each other, an insulator 12 is provided there between.

For instance a metallic housing cover can be mounted via a plastic thread to be electrically insulated from the connecting head. The cover can be directly utilized as antenna when it is directly coupled, for instance, to an integrated transmitter through a wire or high-frequency radiation.

Likewise metallic adaptor plates for exchangeable plug variants provided for a measuring instrument can be electrically insulated from the housing and can be used as antenna.

Component parts and thus costs for the measuring instrument can be advantageously saved by the fact that the housing members such as, for instance, the housing and the cover serve as dipoles of the antenna.

In accordance with another embodiment, the measuring instrument includes an optical display, which can be, for instance, in the form of an observation window or an electronic display element, such as, for example, a 7-segment display, LCD display, etc.

The observation window is preferably made of glass exhibiting good dielectric characteristics.

According to this embodiment, an antenna structure, for example a spiral antenna or a circular antenna, is applied to the observation windows or the inspection glass of the display member of the measuring instrument. Also, the antenna structure can be applied onto or below the dial.

The antenna structure can consist, for instance, of a conductive paste which is applied to the pane or the dial by a lithographic process.

Figure 5:
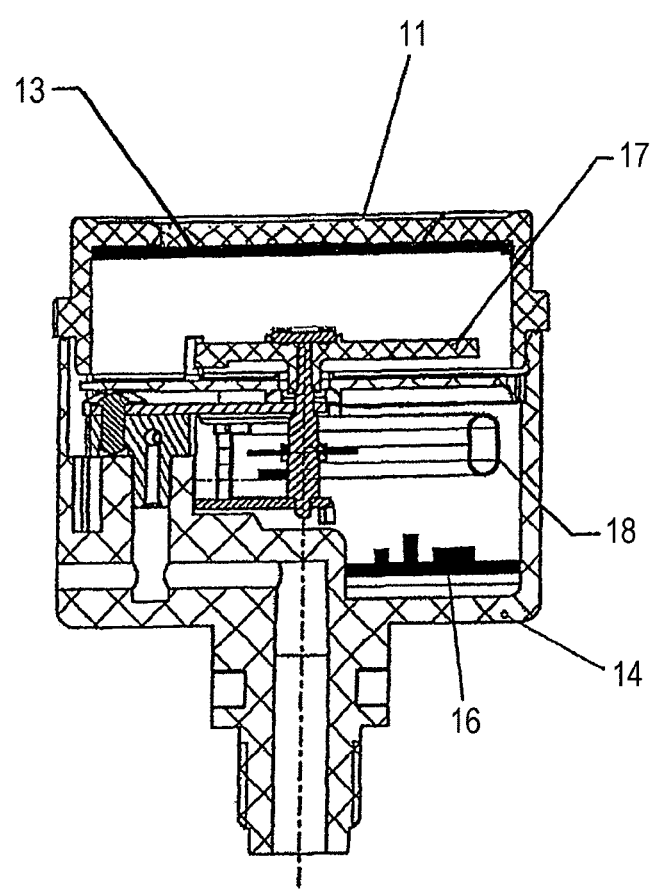
FIG. 5 shows a sectional view of a pressure gauge comprising a tubular spring, a converting circuit and an integrated antenna in accordance with an embodiment of the invention.

FIG. 5 shows a sectional view of a pressure gauge comprising a tubular spring, a converting circuit and an integrated antenna in accordance with an embodiment of the invention.

Reference numeral 11 denotes the observation window of the pressure gauge through which an indication of the metered value can be read below the pointer denoted with reference numeral 12 in combination with a dial.

Reference numeral 14 denotes the housing of the pressure gauge according to this embodiment including a tubular spring as part of the (mechanical) pressure gauging system. These elements are shown to illustrate the configuration according to the first embodiment of the invention, but they can also be replaced with elements equally acting in accordance with other embodiments of the invention.

Reference numeral 16 denotes a printed circuit board including the custom-designed integrated circuit for converting the metered value into a corresponding signal.

Moreover an antenna structure 13 is applied below the observation window.

Embodiments of the present invention are not restricted an antenna structure that is applied to the dial and/or the observation window; the antenna structure can also be arranged, for instance, at housing portions made of plastic or at another appropriate component part of the measuring instrument.

The antenna structure can further be realized, for instance, by MID (Molded Interconnect Device) technology.

Figure 6:
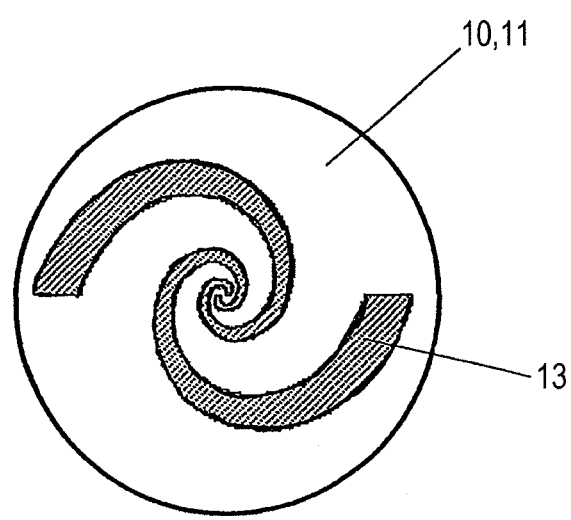
FIG. 6 shows a component part of the measuring instrument including an applied spiral antenna in accordance with an embodiment of the invention.

FIG. 6 illustrates an antenna structure 13 applied to the dial 10 or the observation window 11 in the form of a spiral antenna.

As explained in the foregoing, a component of the antenna can be formed of at least part of the housing and/or part of the functional member of the measuring instrument.

In accordance with another embodiment, the antenna constitutes the pointer 17 of the measuring instrument. That is to say that an antenna structure can be applied onto the pointer, for instance, or else an appropriately modified antenna member serves as pointer.

Also, other components of the functional member can serve as part of or as complete antenna. According to another embodiment of the present invention, the Bourdon spring and/or the return spring of a mechanical manometer can be designed so that they serve as antenna or as a member thereof.

In order to ensure the electric supply of the circuit for converting the metered value into a signal and, where necessary, amplifier circuits, an energy supply is provided in the measuring instrument. This can be constituted, for instance, by a battery, a fuel cell or a photovoltaic element but also by a combination of these or other means adapted to supply circuits of this type.

The measuring instrument according to the invention is included in a process while being preferably hermetically sealed.

The antenna according to embodiments of the present invention can be in the form of a RFID (Radio Frequency Identification) label, and can be designed for medium-range radio transmission paths, such as, e.g., Bluetooth, etc., or can be designed as antenna for longer transmission paths.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A measuring instrument for measuring a measurand of an object under measurement, comprising:
    a functional member for converting the measurand into a metered value;
    a housing including two metallic elements which are electrically insulated from each other via an insulating element; and
    an antenna,
    wherein at least part of the housing and/or part of the functional member form a component part of the antenna, and
    wherein the metallic elements form dipoles of the antenna.

2. A measuring instrument according to claim 1, further comprising a circuit for converting the measurand into a radio signal, the antenna emitting the radio signal.

3. A measuring instrument according to claim 2, wherein the measuring instrument further includes an energy supply for supplying the circuit for conversion.

4. A measuring instrument according to claim 3, wherein the energy supply comprises a battery and/or a fuel cell and/or a photovoltaic element.

5. A measuring instrument according to claim 1, wherein the housing includes a metallic member forming a ground plane of the antenna.

6. A measuring instrument according to claim 1, wherein a portion of the housing includes an optical display and the antenna is contained in the optical display.

7. A measuring instrument according to claim 1, wherein a portion of the housing is made of plastic material and the antenna is provided at said portion in the form of an antenna structure.

8. A measuring instrument according to claim 1, wherein the functional member includes a meter movement having a movable element including a pointer and a dial.

9. A measuring instrument according to claim 8, wherein the antenna is formed on the dial as antenna structure.

10. A measuring instrument according to claim 1, wherein the measuring instrument is a manometer.

11. A measuring instrument according to claim 1, wherein the housing is hermetically sealed.

12. A measuring instrument according to claim 1, further comprising a connector input for connecting the object under measurement to the measuring instrument and entering the measurand, wherein the connector input is connected to the object under measurement in a sealing manner.

13. A measuring instrument for measuring a measurand of an object under measurement, comprising:
    a functional member for converting the measurand into a metered value;
    a housing; and
    an antenna
    wherein at least part of the housing and/or part of the functional member form a component part of the antenna,
    wherein a portion of the housing includes an optical display and the antenna is contained in the optical display, and
    wherein the optical display includes an observation window and the antenna is applied onto the observation window in the form of an antenna structure.

14. A measuring instrument according to claim 13, wherein the observation window is made of glass and the antenna structure is an antenna printed onto the glass.

15. A measuring instrument according to claim 13, wherein the antenna structure is formed by a conductive paste.

16. A measuring instrument according to claim 13, wherein the antenna structure is a Molded Interconnect Device.

17. A measuring instrument, for measuring a measurand of an object under measurement comprising:
    a functional member for converting the measurand into a metered value;
    a housing; and
    an antenna,
    wherein at least part of the housing and/or part of the functional member form a component part of the antenna,
    wherein the functional member includes a meter movement having a movable element including a pointer and a dial, and
    wherein the pointer is in the form of an antenna.

18. A measuring instrument, for measuring a measurand of an object under measurement comprising:
    a functional member for converting the measurand into a metered value;
    a housing; and
    an antenna,
    wherein at least part of the housing and/or part of the functional member form a component part of the antenna,
    wherein the measuring instrument is a manometer, and
    wherein the functional member includes a Bourdon spring and a return spring, the antenna being formed by the Bourdon spring and/or the return spring.

* * * * *